United States Patent [19]

Stedman

[11] Patent Number: 5,746,241

[45] Date of Patent: May 5, 1998

[54] PRECISION DISPENSING SYSTEM

[75] Inventor: David Stedman, Kirkland, Wash.

[73] Assignee: AgriBioTech, Inc., Las Vegas, Nev.

[21] Appl. No.: 531,210

[22] Filed: Sep. 19, 1995

[51] Int. Cl.$^6$ .................................................. G05D 11/13
[52] U.S. Cl. .................................................. 137/101.21
[58] Field of Search .................... 137/93, 101.19, 137/101.21, 100

[56] References Cited

U.S. PATENT DOCUMENTS

| | | | |
|---|---|---|---|
| 2,207,327 | 7/1940 | Maurer | 137/101.21 |
| 3,520,448 | 7/1970 | Russell | 222/57 |
| 4,006,752 | 2/1977 | De Vale | 137/101.21 |
| 4,007,755 | 2/1977 | Lerner et al. | 137/101.21 |
| 4,176,672 | 12/1979 | Borberg | 137/101.21 X |
| 4,337,786 | 7/1982 | Myers et al. | 137/37 |
| 4,955,507 | 9/1990 | Kirschner et al. | 137/100 |
| 5,143,257 | 9/1992 | Austin et al. | 222/57 |
| 5,218,988 | 6/1993 | McNamara et al. | 137/101.21 |
| 5,368,059 | 11/1994 | Box et al. | 137/3 |
| 5,398,711 | 3/1995 | Ardrey | 137/93 |

*Primary Examiner*—Stephen M. Hepperle
*Attorney, Agent, or Firm*—Henry P. Sartorio

[57] ABSTRACT

A microprocessor controlled precision dispensing system (PDS) introduces an additive into a flowing liquid. A fixed amount of additive is introduced per unit volume of the liquid. The fixed amount can be changed by the user and can be varied as a function of an external parameter. The PDS includes a dispensing device which is actuated by a flow meter. The liquid flows through the flow meter which includes a Hall effect transducer which measures flow rate. The signal from the Hall effect transducer is input into a microprocessor mounted in the dispensing device. The microprocessor controls a stepper motor which drives a crankshaft which drives a reciprocating pump. The release of the additive is correlated to the volume of liquid flow. The dispensing device includes means for selecting the amount of additive to be dispensed per gallon of liquid. For example, the system can be set to dispense an amount from 0–10 ml/gal; this amount can be changed by increments of 0.01 ml. Also included are means to accumulate the total amount of additive dispensed. The microprocessor can also be programmed to vary the amount dispensed as a function of some external parameter.

18 Claims, 7 Drawing Sheets

PRECISION DISPENSING SYSTEM

BACKGROUND OF THE INVENTION

1. Field of the Invention

The present invention relates generally to dispensing systems and more particularly to systems for accurately introducing an additive into a flowing liquid.

2. Description of Related Art

In a variety of applications, it is necessary to introduce controlled amounts of an additive into a liquid stream. One particular field of application is agriculture, including animal husbandry. There are a number of different approaches, all of which have limitations in practical utilization.

U.S. Pat. No. 3,520,448 to Russell shows a liquid proportion device in which a rotating vane type flow meter measures liquid flow into a blending tank. The meter also controls a switch which controls a motor which drives a dispensing pump which injects an additive into the blending tank. The amount of additive dispensed is determined by a gear ratio. The motor also drives a switch follow up device which opens the switch and shuts off the motor after dispensing an amount of the additive.

U.S. Pat. No. 4,006,752 to DeVale describes a system in which a fluid flowing through a conduit rotates a magnet which is detected by a Hall effect device. The output of the Hall effect device is fed to a digital counter which is connected to a comparator. When a preset count is reached, the comparator triggers a timer connected to an electronic switch that turns on a feeder that supplies additives to the fluid in the conduit. The concentration of the additive is controlled by changing the setting of the comparator.

U.S. Pat. No. 4,007,755 to Lerner et al. shows a system which regulates additive injection into a main stream of fluid by timing circuits. Additive is continuously pumped through a circuitous flow path. A timing control system which receives signals from a turbine meter in the main stream opens a valve in the additive flow path for a predetermined length of time.

U.S. Pat. No. 4,337,786 to Myers et al. describes a system for controlling release of an additive into a main flow line using a flow control timer circuit. A paddle wheel flow meter in the main line is connected to an accumulator which triggers the flow control timer circuit. The timer opens a solenoid valve in the additive line for a preset period of time.

U.S. Pat. No. 5,143,257 to Austin et al. shows a dispensing system for proportional mixing of liquids using a solenoid operated injection pump. A flow meter with a Hall effect switch and an optical pressure sensor are connected to the main line. Signals from the two sensors are electronically combined to control the pump.

U.S. Pat. No. 5,218,988 to McNamara et al. describes a liquid metering system in which a pressurized first liquid is coupled to the input port of a venturi injection unit and a peristaltic pump couples metered amounts of a second liquid to the injection port of the venturi injection unit. A controller actuates the peristaltic pump to deliver a predetermined amount of second liquid during each operational cycle of the system without regard to the flow rate of the first liquid.

U.S. Pat. No. 5,368,059 to Box et al. shows a plural component system for sequential metering of multiple fluids. First and second fluids flow through separate flow paths to a mixer; a meter and valve are in each flow path. A digital controller connected to the two meters calculates the amount of second liquid to be dispensed based on the actual amount of first liquid dispensed.

The Dosatron liquid dispenser is a totally mechanical device which is used for agricultural applications. U.S. Pat. Nos. 5,261,311; 5,050,781; 5,000,804; 4,785,713; 4,756,329; 4,060,351; 4,021,153; 3,937,241 to Philippe or Jean Cloup are directed to mechanical mixing devices.

There is still a need in the field for a precision dispensing system with greater flexibility and greater accuracy than provided by the prior art. In particular it is desirable to be able to readily adjust the amount dispensed by small increments over a broad range. It is also desirable to be able to vary the amount dispensed as a function of other external parameters. It is also desirable to be able to easily daisy chain multiple units together.

SUMMARY OF THE INVENTION

Accordingly it is an object of the invention to provide an improved dispensing system for accurately introducing an additive into a flowing liquid.

It is also an object of the invention to readily adjust the amount dispensed by small increments over a broad range.

It is a further object of the invention to be able to vary the amount dispensed as a function of other external parameters.

The invention is a microprocessor controlled precision dispensing system (PDS) which introduces an additive into a flowing liquid. A fixed amount of additive is introduced per unit volume of the liquid. The fixed amount can be changed by the user and can be varied as a function of an external parameter.

The PDS includes a dispensing device which is actuated by a flow meter. The liquid flows through the flow meter which includes a Hall effect transducer which measures flow rate. The signal from the Hall effect transducer is input into a microprocessor mounted in the dispensing device which is enclosed in a waterproof box. The components of the mixing device are mounted on both sides of a plate or board mounted in the box.

An electronics board containing a microprocessor is mounted onto the plate as is a stepper motor which is controlled by the microprocessor. The stepper motor drives a crankshaft which drives a reciprocating pump. Inlet and outlet ports of the dispensing device are connected by tubing to the pump to release selected amounts of additive into a container or tank which receives the liquid passing through the flow meter.

The release of the additive is correlated to the fluid flow. The dispensing device includes means for selecting the amount of additive to be dispensed per gallon of liquid. For example, the system can be set to dispense an amount from 0–10 ml/gal; this amount can be changed by increments of 0.01 ml. Also included are means to accumulate the total amount of additive dispensed. The microprocessor can also be programmed to vary the amount dispensed as a function of some external parameter.

The PDS translates input pulses, that are a function of liquid flow rate, to output pulses to drive a stepper motor and subsequently a pump that dispenses an additive to be mixed with the liquid. Each pulse from the transducer corresponds to a particular volume of liquid that has passed through the flow meter, and causes the stepper motor to advance by one rotation step, thereby releasing some additive. Every full rotation of the stepper motor releases the preset amount of additive.

DETAILED DESCRIPTION OF THE INVENTION

Figure 1:
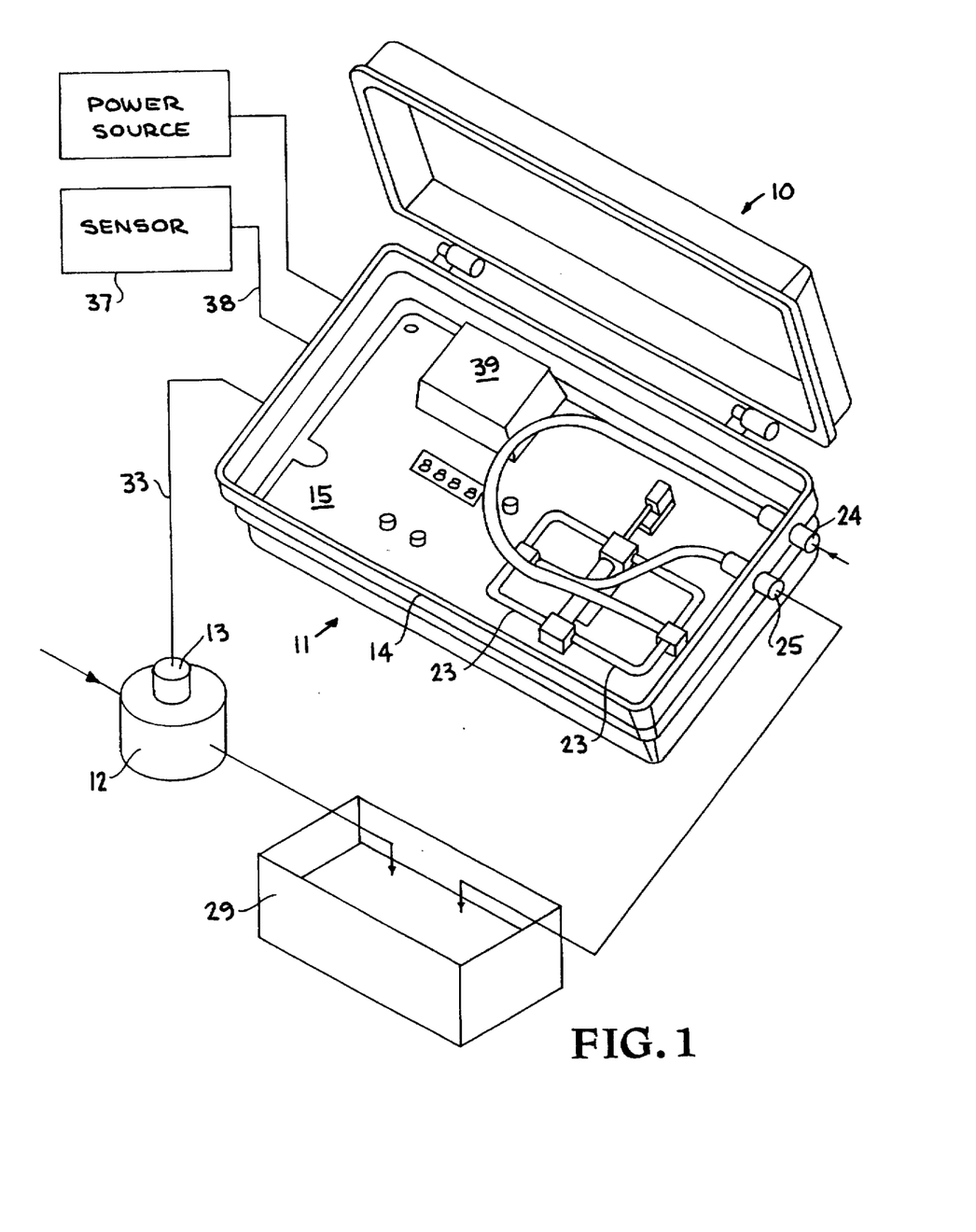
FIG. 1 is a perspective view of the precision dispensing system.

As shown in FIG. 1, precision dispensing system (PDS) 10 includes a dispensing device or unit 11 and a flow meter 12. Flow meter 12 is a volumetric flow meter and measures the volume of the liquid which flows therethrough. Flow meter 12 includes a Hall effect transducer 13 which provides an electrical signal dependent on flow rate. The signal from Hall effect transducer 13 is input by electrical cable 33 into a microprocessor in the dispensing device 11.

Figure 3:
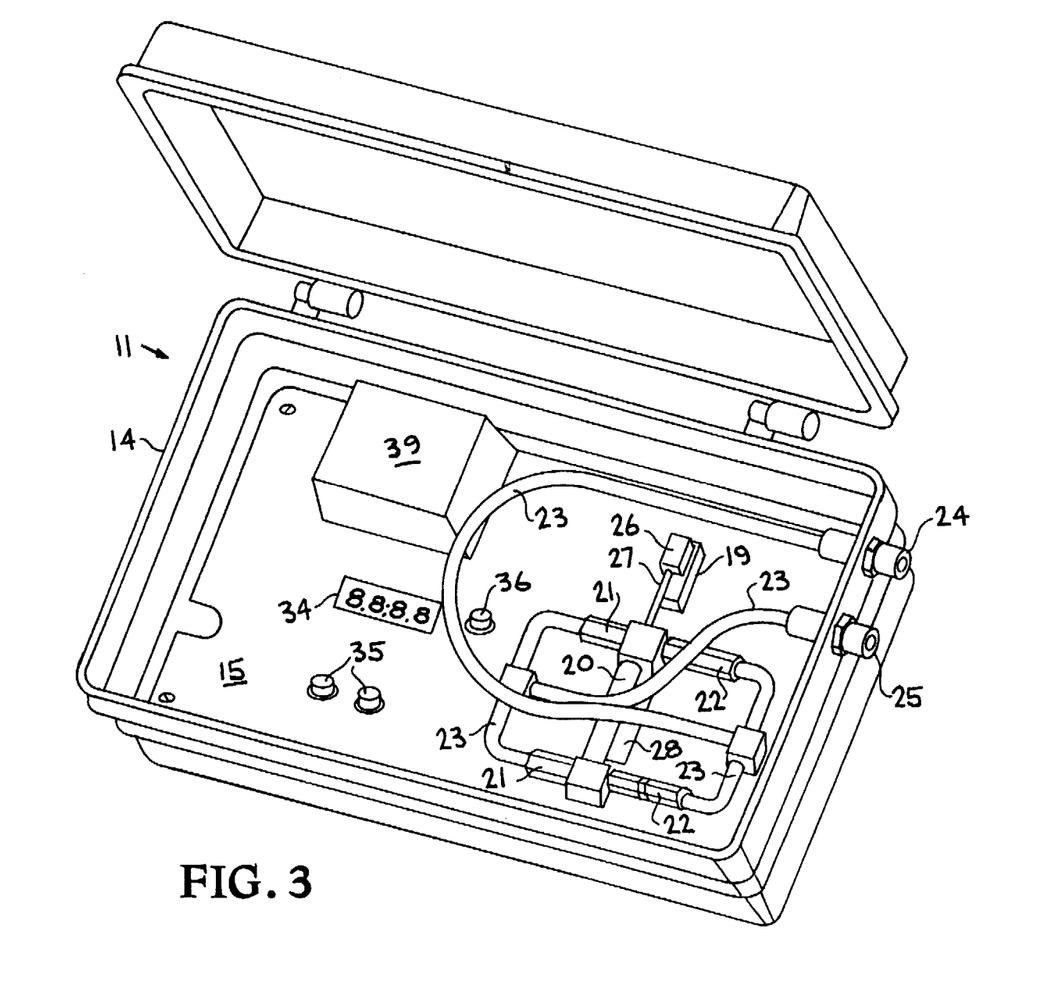
FIG. 3 is a perspective view of the dispensing unit of the PDS.

As shown in FIGS. 1 and 3, dispensing device 11 is enclosed in a waterproof box 14. All the components of dispensing device 11 are mounted on both sides of a plate or board 15 which is mounted in box 14.

Figure 2A:
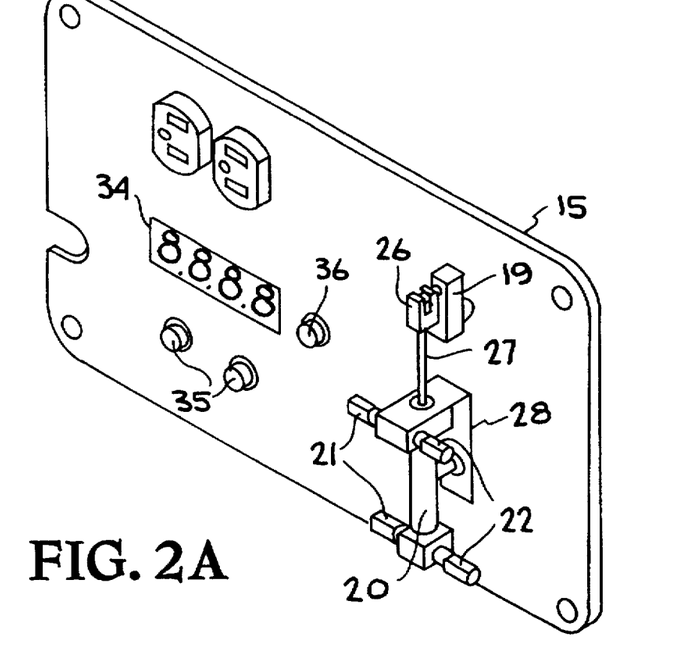
FIGS. 2A, B are perspective views of the top and bottom of the mounting plate of the PDS.
Figure 2B:
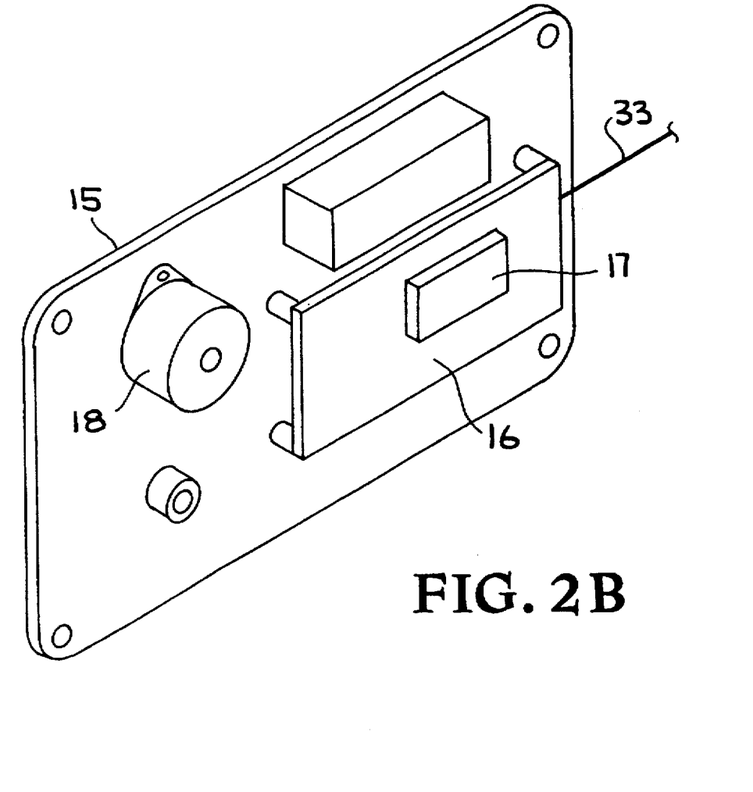

As shown in FIGS. 2A, B, an electronics board 16 which includes a microprocessor 17 is mounted on the bottom of plate 15. A stepper motor 18 which is controlled by microprocessor 17 is also mounted on the bottom of plate 15. Stepper motor 18 drives a crankshaft 19 which drives a reciprocating pump 20 mounted on the top of plate 15.

Reciprocating pump 20 has a pair of inlets 21 and a pair of outlets 22. Inlets 21 are connected together and outlets 22 are connected together by tubing 23 which also connects the inlets 21 and outlets 22 to inlet and outlet ports 24, 25, respectively, of dispensing unit 11.

In operation, stepper motor 18 rotates crankshaft 19. Pump coupler 26 which is connected to pump shaft 27 is pivotably connected to crankshaft 19. Pump 20 is mounted on bracket 28 which is pivotably mounted on plate 15. As the stepper motor incrementally turns crankshaft 19, pump mounting bracket 28 also turns so that the rotary motion of crankshaft 19 is converted to reciprocating linear motion of pump shaft 27. The reciprocating motion of pump shaft 27 draws additive into the pump through one of inlets 21 and expels the additive through one of outlets 22.

The additive is supplied to dispensing unit 11 through inlet port 24 and controllably released through outlet port 25 into a container or tank 29 which also receives the liquid passing through the flow meter 12. Thus a precision amount of additive is combined in tank 29 with a particular volume of liquid.

Figure 5:
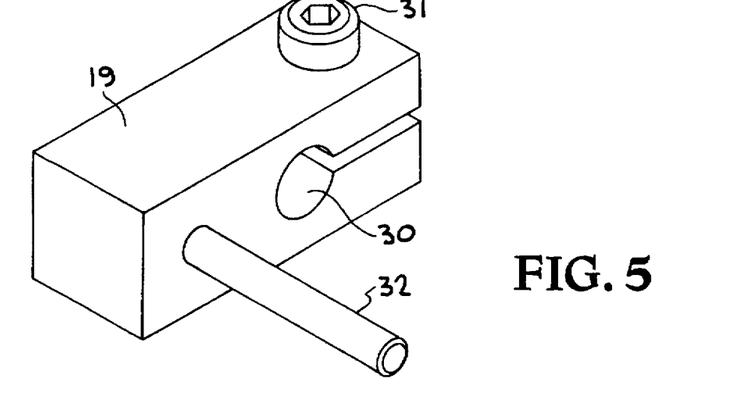
FIG. 5 is a perspective view of the crankshaft.

The crankshaft 19, shown in FIG. 5, is fixedly attached to the stepper motor shaft which extends through plate 15. The stepper motor shaft fits into opening 30 and allen head screw 31 is tightened. Pin 32 extending from crankshaft 19 engages the pump coupler 26.

The dispensing unit 11 translates input pulses from the Hall effect sensor 13, that are a function of liquid flow rate, to output pulses to drive a stepper motor which drives a pump which dispenses an additive to be mixed in a precise and adjustably controllable amount with the liquid. Each pulse from Hall effect transducer 13 corresponds to a particular volume of liquid that has passed through flow meter 12, and causes stepper motor 18 to advance by one rotation step, thereby releasing some additive. Each full rotation of stepper motor 18 produces one complete stroke of pump 20 which releases an amount of additive determined by pump capacity, e.g. 2.16 ml.

Dispensing unit 11 also includes means for selecting the amount of additive. There is a display 34, e.g. a 4 digit liquid crystal display (LCD), on plate 15. A pair of switches 35 on plate 15 are used to increase (INCREASE DOSAGE) or decrease (DECREASE DOSAGE) the amount. In each cycle, i.e. one complete (360°) turn of the stepper motor 18, an amount of additive displaced by one full stroke of pump 20 is released, e.g. 2.16 ml. In a preferred embodiment, an amount from 0 to 10 ml/gal can be added per unit volume of liquid. The amount can be changed in increments of 0.01 ml/gal using the switches 35 to set the desired value. The desired amount is dispensed by performing a ratiometric calculation in microprocessor 17 and driving the stepper motor 18 and pump 20 sufficiently to release the desired amount. The dispensing unit 12 also includes means for accumulating the total amount of additive dispensed. Switch 36 (TOTAL DISPENSED FLUID IN LITERS) on plate 15 is used to display the total accumulated amount on display 34.

In a preferred embodiment the microprocessor based dispensing unit 11 operates on 12 vdc. As illustrated, this is provided by connecting the unit 11 to a conventional external AC power source and using AC adapter 39 mounted on plate 15 to convert the input power to the appropriate operational voltage. However, the system can be designed to work on alternative power sources, e.g. the system can have a 12v connection to an external source, either AC or DC.

Figure 6:
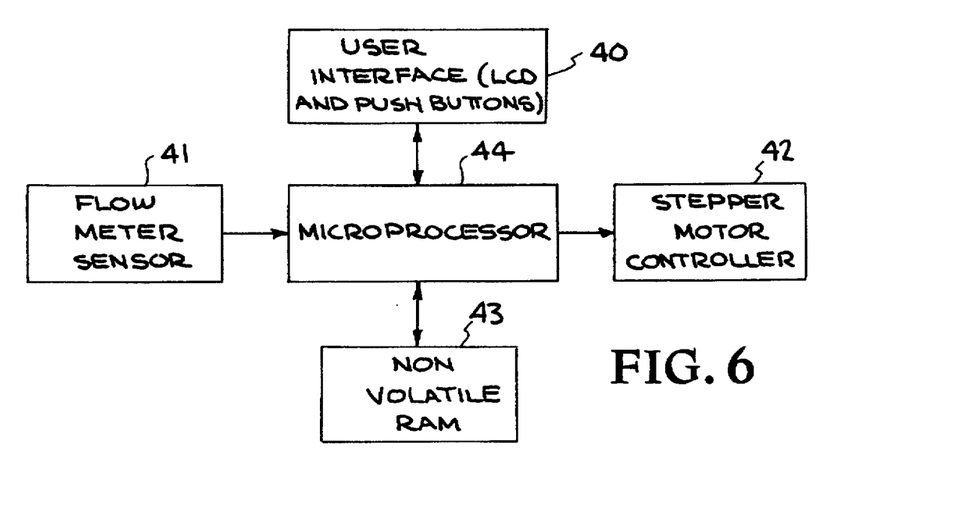
FIG. 6 is a block diagram of the PDS system.

A block diagram of the microprocessor based PDS system is shown in FIG. 6. User interface 40 is formed of push button switches 35, 36 and numerical display 34. While in a preferred embodiment there are three push button switches and a 4 digit LCD display, any general user interface which provides for suitable input and display can be used, including a remote control and display system such as a central monitoring station.

Flow meter sensor 41 is preferably a Hall effect switch 13 which converts magnetic flux density to an electrical pulse on or off state. This pulse is used to drive the external interrupt signal on a typical microprocessor circuit. An edge of this pulse signifies that the flow meter rotation has advanced such as to indicate how much water has passed through the flow meter. In a preferred embodiment, the flow meter 12 produces 112 pulses for every gallon of water flowing therethrough.

Stepper motor controller 42 translates each input pulse to control signals to a stepper motor 18 causing the stepper motor to advance by one rotation increment. In a preferred embodiment, the rotation increment is 7.5°. The pump 20 releases 2.16 ml (or equivalently cc) of additive for every full rotation of the stepper motor, which is achieved every 48 pulses input to the stepper motor controller 42.

Non-volatile RAM storage device 43 provides memory for the present dispensing setting and the accumulated total of additive dispensed.

Microprocessor 44 is a typical microprocessor circuit which contains the software for manipulating the input to output pulse relationships and controlling other components of the PDS.

Figure 7:
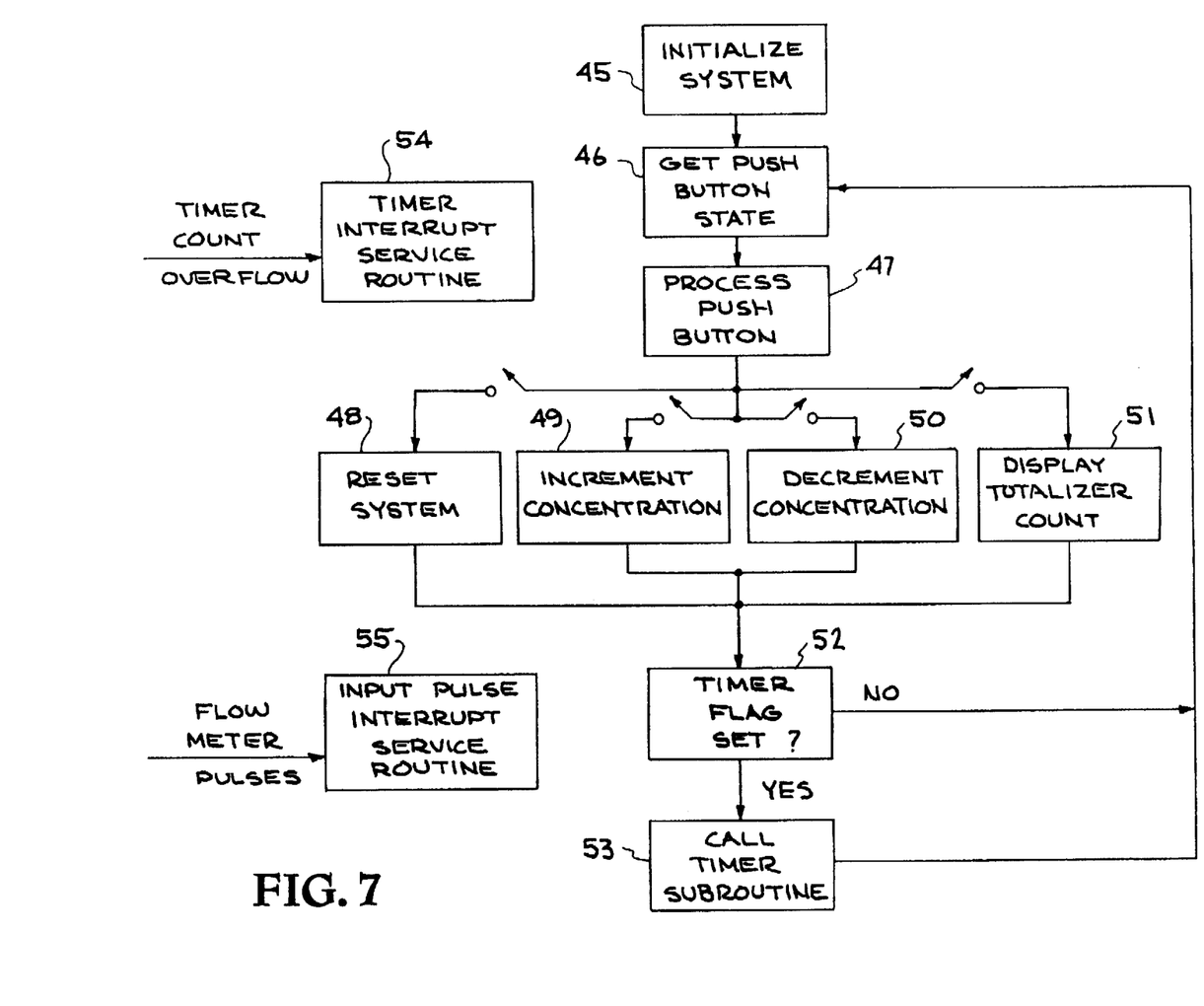
FIG. 7 is a flow chart of the PDS system software.

The overall software flow ("main" program flow) within the PDS is shown in FIG. 7. Upon power-up reset, the system enters initialization 45 where several variables are cleared, default or previously stored values (from non-volatile RAM) are retrieved, and the user interface means are initialized. During system initialization 45, a pulse accumulator variable is cleared to zero to begin pulse counting/accumulating. After the previous totalizer values and dispensing concentration are retrieved, a subroutine is called to calculate a new input/output pulse ratio factor. The pulse ratio factor is calculated from three system constants. The first system constant is a measure of how many pulses are received on the input for each gallon of liquid that flows through the flow meter, e.g. 112 input pulses/gal. The second system constant is the volume (ml or cc) of additive dispensed form the pump for each stroke (revolution) of the stepper motor, e.g. 2.16 ml/stroke. The third constant is the number of output pulses required to cause the stepper motor to revolve through 360°. Since each step is 7.5°, there are exactly 48 output pulses per revolution. The following equation establishes the required input to output pulse ratio:

Pulse Ratio=[$X$(ml/gal)·(48 ouput pulses/stroke)]/[(2.16 ml/stroke)·(112 input pulses/gal)]=$X$·(0.198413) where $X$ is the desired concentration.

Subroutine 46 acquires the state of the input switch push buttons. After suitable debouncing of the switch contacts, processing routine 47 is carried out. If all three push buttons are held down, a system reset 48 is executed. If the increment button (INCREASE DOSAGE) is pressed, block 49, the user desired dispensing concentration is raised to the next unit, until an upper limit is achieved. If the decrement button (DECREASE DOSAGE) is pressed, block 50, the user desired dispensing concentration is lowered to the next unit, down to the minimum, e.g. 0.01 ml/gal. If the totalize switch is pressed, block 51, the system display will show the accumulated total of additive that has been dispensed since the last reset was applied.

After processing the switch state, a timer flag is checked, block 52, to see if the system timer has rolled over its maximum count. If so, then a timer subroutine 53 is called to provide further real time actions. If the timer has not rolled, then program control goes back to the top of the loop, block 46, to monitor switch closure once again.

Figure 8:
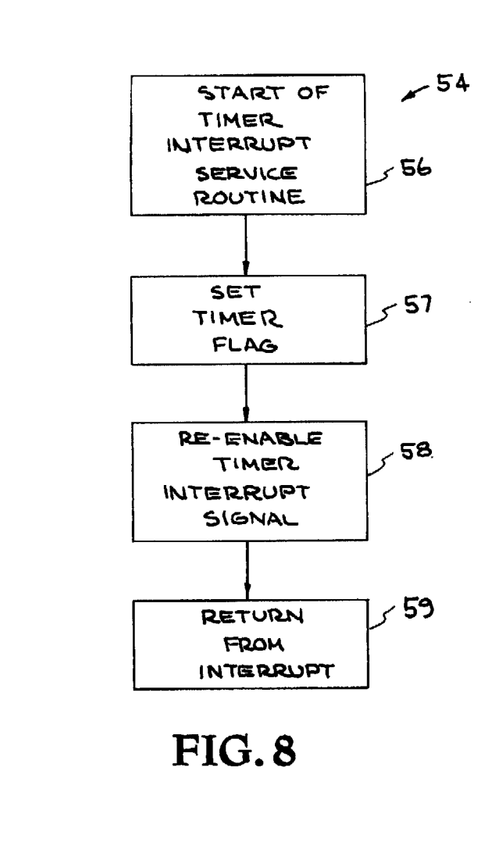
FIG. 8 is a flow chart of the timer interrupt service routine.

Timer interrupt service routine 54 is executed periodically, e.g. every 131 ms. The details of interrupt service routine 54 are shown in FIG. 8, including start 56, set timer flag 57, reenable timer interrupt signal 58, and return 59. Each time this interrupt occurs, the timer flag is set and the timer interrupt mechanism is rearmed for the next 131 ms.

Figure 9:
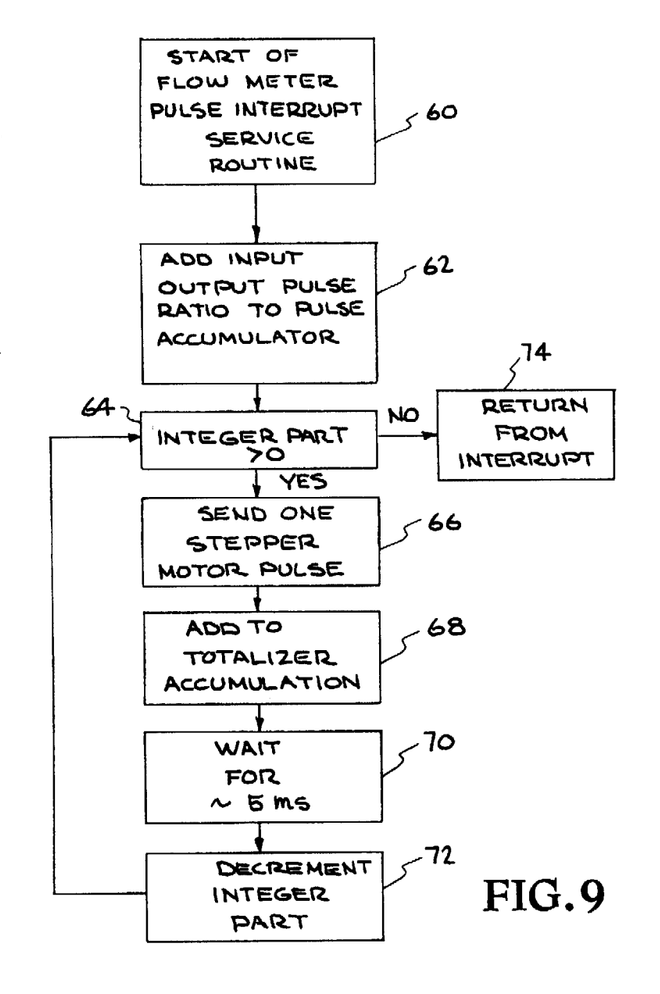
FIG. 9 is a flow chart of the input/output pulse algorithm.

For each input pulse edge from the flow meter, an input pulse interrupt service routine 55 is executed where much of the actual input to output pulse processing occurs for the dispensing algorithm. The details of the input/output pulse algorithm are shown in FIG. 9. From the start, block 60, the previously calculated pulse ratio is added to the previous pulse ratio, block 62. The integer portion of this accumulated value is evaluated for being greater than zero, block 64. Typically the integer portion is either a 1 or 2. If the integer portion is zero, then the interrupt service routine exits, block 74. If the integer portion is non-zero, then a pulse is sent to the stepper motor, block 66; and amount is added to the total volume of additive dispensed, block 68; a time delay, e.g. 5 ms, is executed to prevent overrun of the stepper motor, block 70; and the integer portion of the accumulation is decremented, block 72. This process is repeated until the integer portion is finally zero, in which case the interrupt service routine exits, block 74.

Figure 10:
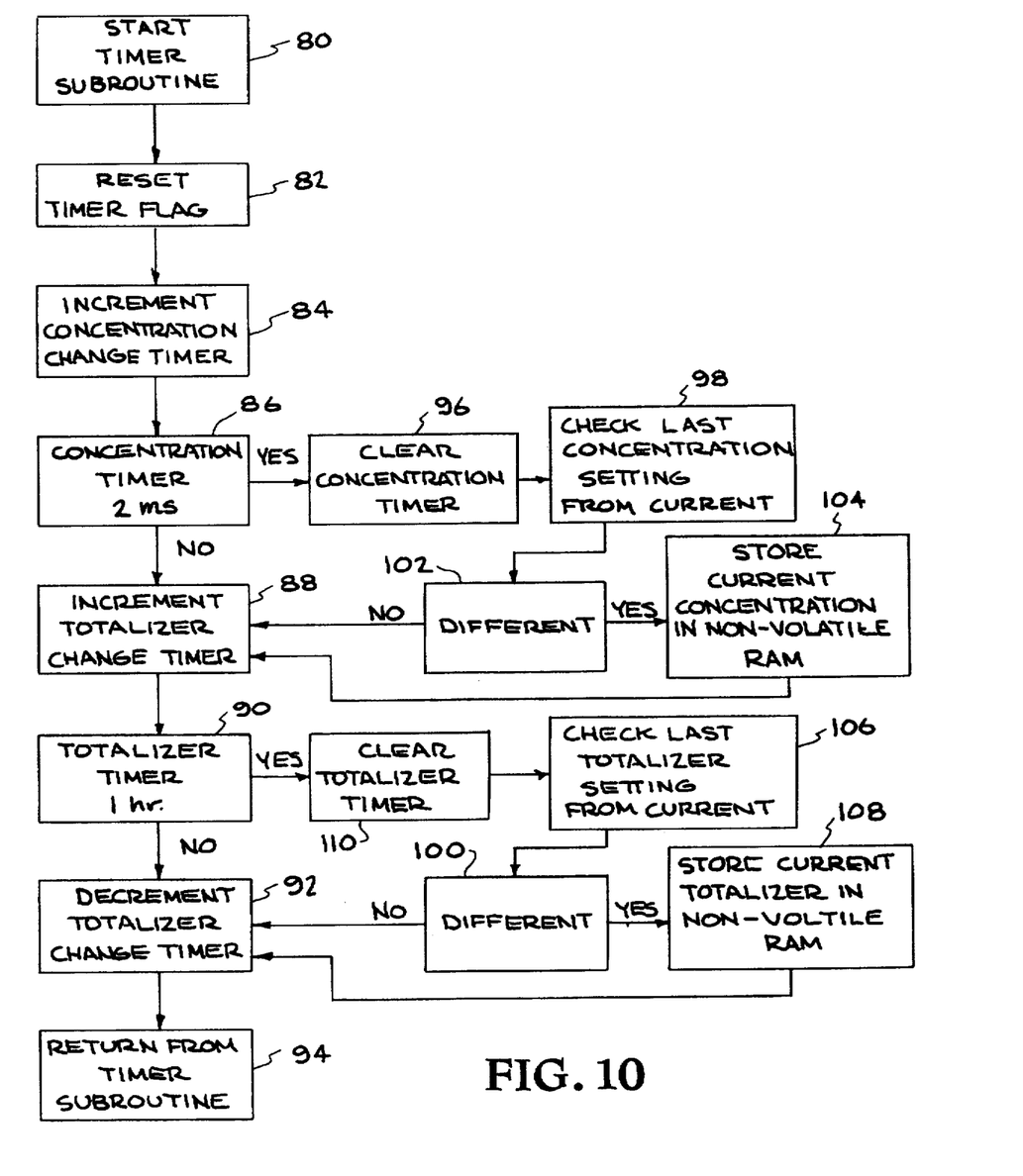
FIG. 10 is a flow chart of the timer subroutine.

The final processing for the PDS is performed in the timer subroutine, shown in FIG. 10, beginning at start block 80. In this subroutine, two different time counts are evaluated at each 131 ms interval. First, the timer flag is reset, block 82. Then the dispense concentration change counter is incremented, block 84. If the count has reached its timeout, e.g. 2 ms, block 86, then the dispense concentration change counter is reset, block 96, and the current dispensing concentration is checked against the last stored dispensing concentration, block 98. If they differ, block 102, then the current dispensing concentration is stored in non-volatile RAM, block 104.

Next, either from block 86, or blocks 102 or 104, the totalizer change counter is incremented, block 88. If the count has reached its timeout, e.g. 1 hr, block 90, then the totalizer change counter is reset, block 110, and the current totalizer value is checked against the last stored totalizer value from the previous hour, block 106. If they differ, block 100, then the current totalizer value is stored in non-volatile RAM, block 108. Finally, from either block 90, or blocks 100 or 108, the totalizer change timer is decremented, block 92, and the subroutine is exited, block 94.

The microprocessor based PDS provides many advantages over the prior art in addition to the precise control of amount of additive and ease of changing the amount. For example, other parameters such as temperature, time of day, time of the year, or amount of rainfall can be input to the microprocessor to control the release of additive, e.g. additive will be dispensed only if the temperature is below 50° C. Thus one or more sensors 37 can be connected to the microprocessor through cable 38 so that external parameters can be monitored. Other information can be programmed into the microprocessor. Information can even be transmitted to the dispensing unit 11 from a GPS satellite, e.g. sensor 37 can be an antenna and/or receiver.

Figure 4:
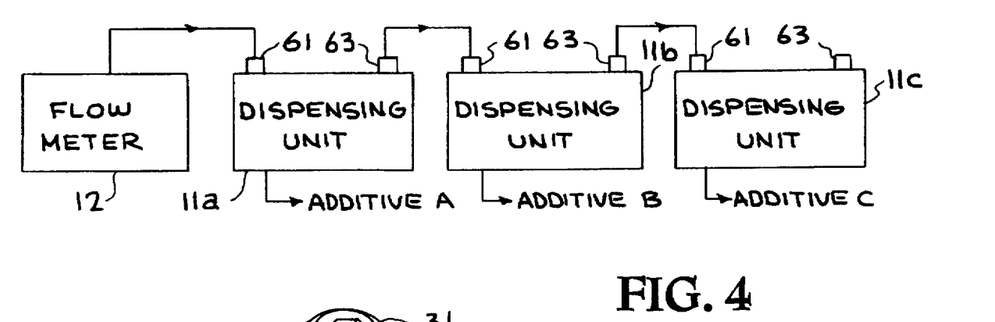
FIG. 4 is schematic drawing of multiple dispensing units.

Another advantage of the PDS system is that a number of different dispensing units 11a, b, c can be daisy chained from a single flow meter 12 as shown in FIG. 4. Each unit 11a, b, c could be designed to have an input connector 61 and output connector 63 to facilitate daisy chaining. Each dispensing unit 11a, b, c can then dispense an independently controllable amount of a different additive into the liquid.

Changes and modifications in the specifically described embodiments can be carried out without departing from the scope of the invention which is intended to be limited only by the scope of the appended claims.

The invention claimed is:

1. A precision dispensing system (PDS) for accurately and controllably introducing an additive into a flowing liquid, comprising:

a flow meter through which the liquid is flowed and which measures the volumetric flow rate of the liquid therethrough and produces signals related thereto;

a microprocessor controlled dispensing device actuated by signals from the flow meter for introducing a selectable fixed amount of additive per unit volume of the liquid;

wherein the dispensing device comprises:

a microprocessor;

a stepper motor controlled by the microprocessor;

a reciprocating pump driven by the stepper motor and having an inlet connected to an additive supply.

2. The PDS of claim 1 further comprising means for selecting the fixed amount of additive per unit volume of liquid.

3. The PDS of claim 2 further comprising means to accumulate the total amount of additive dispensed.

4. The PDS of claim 1 wherein the microprocessor is programmed to vary the amount of additive dispensed as a function of an external parameter.

5. The PDS of claim 1 wherein the flow meter includes a sensor for producing a sequence of input pulses to the microprocessor.

6. The PDS of claim 5 wherein the microprocessor is programmed with an algorithm to produce a plurality of output pulses as a function of a different plurality of input pulses to advance the stepper motor by one rotation step.

7. The PDS of claim 1 wherein the flow meter includes a Hall effect transducer to measure flow rate and produce a sequence of pulses to the microprocessor.

8. The PDS of claim 7 wherein each pulse from the Hall effect transducer corresponds to a particular volume of liquid that has passed through the flow meter and causes the stepper motor to advance by one rotation step, thereby releasing a portion of the fixed amount of additive, and each full rotation of the stepper motor releases the fixed amount of additive.

9. The PDS of claim 1 further comprising a crankshaft connected to the stepper motor and reciprocating pump.

10. The PDS of claim 4 further comprising at least one external sensor connected to the microprocessor for measuring an external parameter.

11. The PDS of claim 1 further comprising a user interface comprising a display and a plurality of switches for changing the fixed amount of additive to be dispensed in defined increments and for displaying the total amount of additive dispensed.

12. The PDS of claim 1 further comprising a plurality of similar dispensing devices all connected to the flow meter, each dispensing a different additive.

13. A precision dispensing system (PDS) for accurately and controllably introducing an additive into a flowing liquid, comprising:
   a flow meter through which the liquid is flowed and which measures the volumetric flow rate of the liquid therethrough and produces a sequence of pulses related thereto;
   a microprocessor controlled dispensing device actuated by the sequence of pulses from the flow meter for introducing a selectable fixed amount of additive per unit volume of the liquid, comprising:
   a waterproof box;
   a plate mounted in the box;
   an electronics board mounted on the plate and containing a microprocessor which receives the sequence of pulses from the flow meter;
   a stepper motor mounted on the plate and controlled by the microprocessor;
   a crankshaft connected to the stepper motor;
   a reciprocating pump mounted on the board and connected to the crankshaft and having a pair of pump inlets and pump outlets;
   an additive inlet port in the box connected to the pump inlets;
   an additive outlet port in the box connected to the pump outlets.

14. The PDS of claim 13 wherein the flow meter includes a Hall effect transducer to measure flow rate and produce the sequence of pulses to the microprocessor.

15. The PDS of claim 14 wherein each pulse from the Hall effect transducer corresponds to a particular volume of liquid that has passed through the flow meter and causes the stepper motor to advance by one rotation step, thereby releasing a portion of the fixed amount of additive, and each full rotation of the stepper motor releases the fixed amount of additive.

16. The PDS of claim 13 wherein the microprocessor is programmed with an algorithm to produce a plurality of output pulses as a function of a different plurality of input pulses to advance the stepper motor by one rotation step.

17. The PDS of claim 13 further comprising a user interface comprising a display and a plurality of switches for changing the fixed amount of additive to be dispensed in defined increments and for displaying the total amount of additive dispensed, and wherein the fixed amount of additive is selectable in the range of 0–10 ml/gal in increments of 0.01 ml/gal.

18. The PDS of claim 1 wherein the fixed amount of additive is selectable in the range of 0–10 ml/gal in increments of 0.01 ml/gal.

* * * * *